Figure 1:
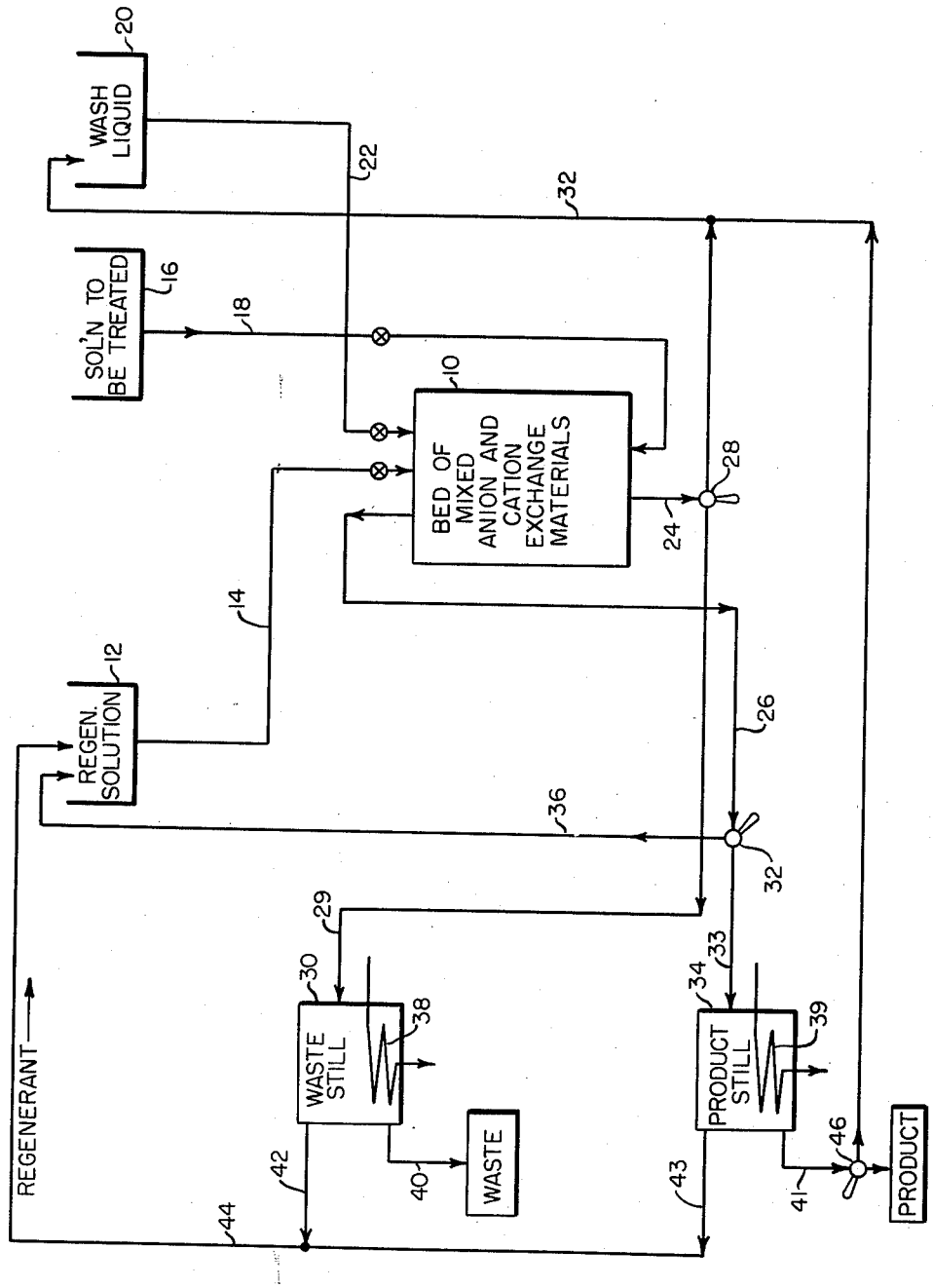

Jan. 1, 1957 E. R. GILLILAND 2,776,258
ION-EXCHANGE-REGENERANT RECOVERY
Filed April 28, 1953 3 Sheets-Sheet 2
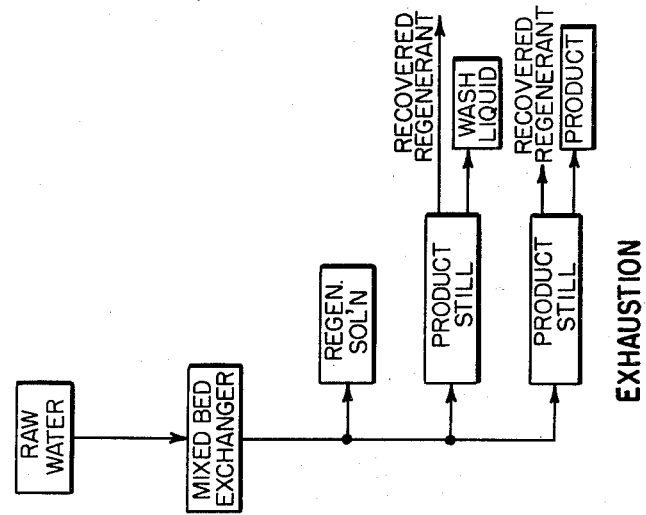
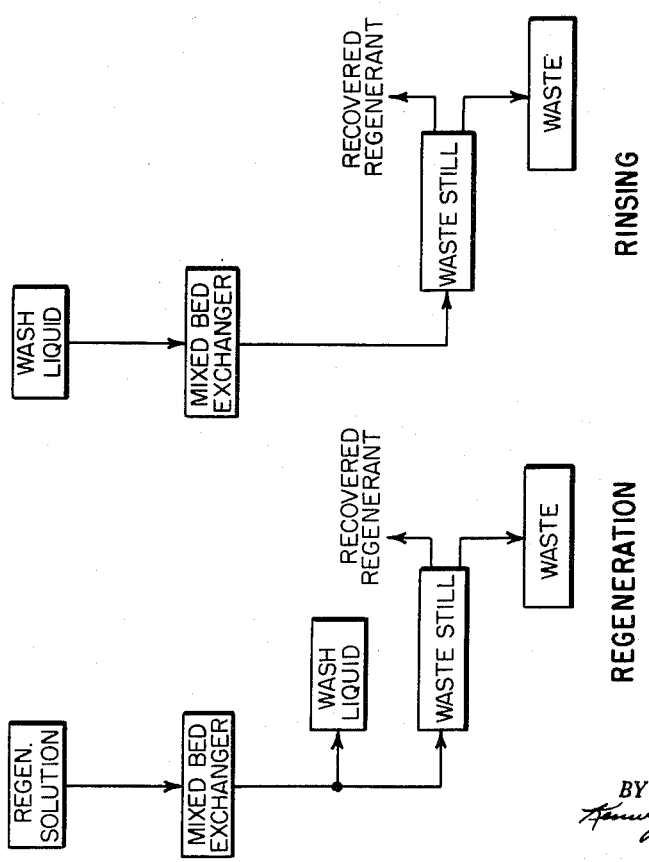
INVENTOR.
EDWIN R. GILLILAND
BY
ATTORNEYS Jan. 1, 1957 E. R. GILLILAND 2,776,258
ION-EXCHANGE-REGENERANT RECOVERY
Filed April 28, 1953 3 Sheets-Sheet 3

INVENTOR.
EDWIN R. GILLILAND
BY
ATTORNEYS

United States Patent Office 2,776,258
Patented Jan. 1, 1957

2,776,258

ION-EXCHANGE-REGENERANT RECOVERY

Edwin R. Gilliland, Arlington, Mass., assignor to Ionics, Incorporated, Cambridge, Mass., a corporation of Massachusetts Application April 28, 1953, Serial No. 351,578

14 Claims. (Cl. 210—24)

The present invention relates to the treatment of ionic solutions by ion exchange and its primary object is to provide an ion exchange process, and apparatus therefor, in which the regenerant chemical is recovered and reused.

In ion exchange processes solid insoluble ion exchange materials are used to treat electrolytic solutions to replace ions of dissolved electrolytes with ions from the solid material. Both anions and cations may be so exchanged, and the removal of dissolved electrolytes from solutions may thus be readily accomplished by replacing the cations and anions of the electrolytes with other cations and anions, frequently hydrogen ions and hydroxyl ions which combine to form water in place of the electrolyte removed.

It is of course necessary to regenerate the ion exchange materials after their capacity to exchange ions has been exhausted. This is accomplished by treating the exchange materials with relatively concentrated solutions of the ions removed from the exchange materials. Regenerant chemicals are thus expended in regenerating the exhausted ion exchangers for reuse in conventional ion exchange processes.

The present invention provides for the recovery of the ions removed from the ion exchange material during its exhaustion and for the regeneration of the exhausted ion exchange material by means of the recovered ions. It is thus possible to carry out cyclical ion exchange processes including exhaustion, regeneration and rinsing of the beds without consuming regenerant chemicals.

The process of this invention is accordingly unlike ion exchange processes of the prior art in that the ions present in the solution after treatment are removed from the treated solution.

This constitutes a substantial advancement over older processes, especially where complete removal is to be accomplished. In the older processes the anions and cations of the dissolved electrolyte are replaced by hydroxyl and hydrogen ions that combine to form water, whereas in the present process they are replaced by ions that are subsequently removed. Thus, not only is the regenerant recovered in the process of this invention but also the formation of water which would be undesirable in the treatment of non-aqueous solutions is avoided.

The present invention utilizes as a regenerant for a bed of intimately mixed anion and cation exchange materials, a salt reversibly dissociable through pressure-temperature variations (that is to say, at elevated temperatures and/or at reduced pressures) into two non-liquid components, at least one of which is gaseous, and such a salt is herein defined and referred to in the specification and claims as a "thermolytic salt," examples of which are ammonium carbonate and ammonium bicarbonate (both dissociable into ammonia and carbon dioxide), ammonium sulfite (dissociable in ammonia and sulfur dioxide), calcium bicarbonate (dissociable into calcium carbonate and carbon dioxide), calcium bisulfite (dissociable into calcium sulfite and sulfur dioxide) and magnesium bicarbonate (dissociable into magnesium carbonate and carbon dioxide).

In the process of this invention a bed of mixed anion exchange material and cation exchange material, effective for the simultaneous exchange of both anions and cations, is first treated with a solution of a soluble thermolytic salt to place the anion exchange material in combination with the anions of the salt, and the cation exchange material in combination with the cations of the salt. The bed in this initial condition may thus be considered as being in combination with the thermolytic salt, and for the purposes of this invention the bed is in the regenerated condition.

Fundamentally, the process of the present invention consists in the exchange of the thermolytic salt in the bed for the ions of the electrolytes in the solution to be treated, the separation and recovery of the thermolytic salt from the several effluent solutions from the bed, and the reuse of the recovered salt in a regenerant solution to regenerate the bed after its exhaustion. The thermolytic salt is recovered by so changing the pressure-temperature conditions of the effluent solution that the salt is dissociated, for instance by heating the effluent or reducing the pressure above it, whereupon its components which are at least partly gaseous and sometimes partly an insoluble solid, may be separated and recovered, then recombined in a solvent under associative pressure temperature conditions to form fresh regenerant solution.

Particularly advantageous use of this invention may be made in the demineralization of brackish or salty natural waters to produce useable water. To provide wash liquids and a solvent in which to dissolve the recovered salt to form the regenerating solution in such installations, appropriate fractions of effluents from the bed are collected from time to time.

The apparatus preferred for this invention consists generally of a bed of ion exchange materials situated in a suitable container having influent and effluent connections, the former connecting with reservoirs for the regenerant solution and the wash liquid and with the source of solution to be treated, and the latter connecting with conduits through which the effluent may be directed to either a regenerant recovery still, the regenerant solution reservoir, or the wash water reservoir. Conduit or other conveyor means are provided to deliver the thermolytic salt recovered from the recovery still to the regenerant solution reservoir, and conduits connect with the drain of the recovery still through which regenerant-free liquid may be either passed to the wash water reservoir, or discharged as waste or product.

In preferred embodiments the solution to be treated and the regenerant solution are passed through the bed of ion exchange materials in mutually opposite directions. For this purpose the influent and effluent connections for the regenerating solution are provided at the top and bottom, respectively, of the container, and the influent and effluent connections for the solution to be treated are provided at the bottom and top, respectively. The separate effluent conduits connect with separate recovery stills, the effluent treated solution conduit connecting with a product still in which the thermolytic salt is removed from the treated solution, and the effluent regenerant conduit connecting with a waste still from which residual thermolytic salt in the effluent regenerant is removed. It is also desirable to treat the effluent wash water as waste solution, and accordingly the wash water reservoir connects to the top of the container and is removed through the effluent regenerant connection from which it may be passed to the waste still.

Commercially available ion exchange materials have been found satisfactory for use in this invention. Suitable cation exchange materials include sulfonated phenol-aldehyde condensation products such as those described in U. S. Patents 2,191,853; 2,204,539; 2,230,614; 2,319,359; 2,448,029; 2,466,675 and 2,518,420; sulfonated polymerizates of monovinyl and divinyl aromatic compounds such as those described in U. S. Patents 2,366,007; 2,466,675 and 2,500,149; and polymerizates of divinyl aromatic compounds and vinyl carboxylic compounds such as those described in U. S. Patents 2,340,110 and 2,340,111. Suitable anion exchange materials include polyamine condensation products such as those described in U. S. Patents 2,362,086; 2,402,384; 2,442,989 and 2,518,956; aminated polymerizates of monovinyl and divinyl aromatic compounds such as those described in U. S. Patents 2,366,008 and 2,591,574, and quaternized aminated polymerizates of monovinyl and divinyl aromatic compounds such as that described in U. S. Patent 2,591,573.

Although satisfactory results can be realized from combinations of any anion and cation exchange materials, best results are attained when the cation and anion exchange materials are of about the same acid and basic strength respectively. Exhaustion and regeneration then proceed to about the same extent in each of the materials, and each material is thus utilized with maximum effectiveness. In Table I several commercially available anion and cation exchange materials are grouped according to their relative strength, and it is preferable to select the anion exchange material and cation exchange material from the same grouping, and to mix them in proportions that provide equal exchange capacities for anions and cations.

TABLE I

*Group I.—Strongly acid or basic exchange materials*

CATION EXCHANGE

| | |
|---|---|
| Dowex 30[1] | Liquonex CRQ[4] |
| Dowex 50[1] | Liquonex CRW[4] |
| Amberlite 100[2] | Permutit Zeo Rex[5] |
| Amberlite 105[2] | Permutit Q[5] |
| Amberlite IR 120[2] | Duolite C-3[7] |
| Amberlite IR 105[2] | Wofatit P[6] |
| Nolcite MX[3] | Wofatit K[6] |
| Nolcite HCR[3] | Wofatit KS[6] |
| Liquonex CRM[4] | Ionac C-200[8] |
| Liquonex CRP[4] | |

ANION EXCHANGE

| | |
|---|---|
| Amberlite IRA 400[2] | Dowex 2[1] |
| Amberlite IRA 410[2] | Nolcite SAR[3] |
| Dowex 1[1] | Permutit S[5] |

*Group II.—Weakly acid or basic exchange materials*

CATION EXCHANGE

| | |
|---|---|
| Amberlite IRC-50[2] | Permutit 216[5] |
| Duolite CS-100[7] | Wofatit C[6] |

ANION EXCHANGE

| | |
|---|---|
| Permutit Deacidite[5] | Duolite A-3[7] |
| Amberlite IR 4B[2] | Wofatit M[6] |
| Amberlite IR 45[2] | Dowex 3[1] |
| Duolite A-2[7] | |

[1] Sold by Dow Chemical Co.
[2] Sold by Rohm and Haas Co.
[3] Sold by National Aluminate Corp.
[4] Sold by Cochrane Corp.
[5] Sold by Permutit Co.
[6] Sold by I. G. Farbenindustrie.
[7] Sold by Chemical Process Co.
[8] Sold by American Zeolite Co.

Figure 5:
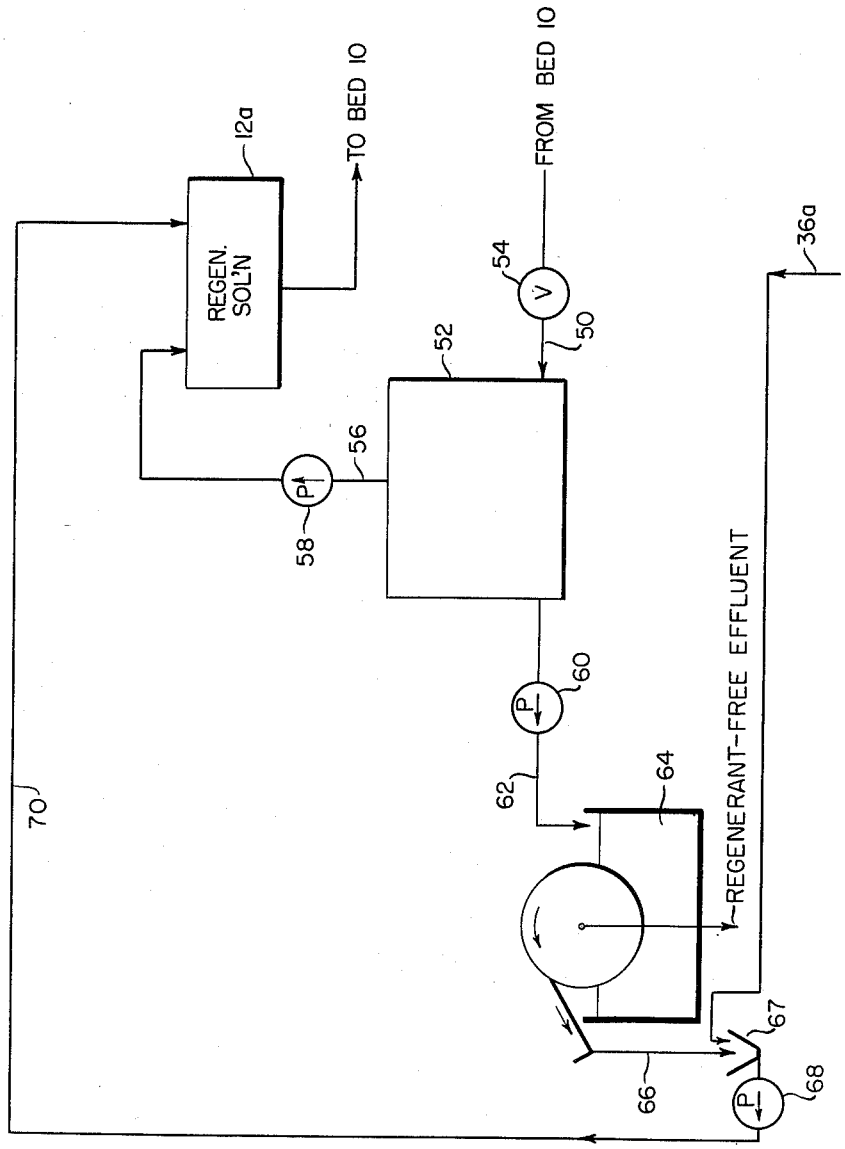

This invention will be better understood and appreciated from the following detailed description of the best manner that has yet been found of carrying it out. Reference is made to the drawings in which:

Fig. 1 is a schematic diagram showing the preferred apparatus of this invention, Figs. 2, 3 and 4 are schematic flow diagrams showing respectively the steps involved during regeneration, rinsing and exhaustion of the bed of ion exchange materials as the process is preferably carried out, and Fig. 5 shows schematically a regenerant recovery system suitable for the recovery of thermolytic salts dissociable into a gaseous component and an insoluble solid component.

Preferred apparatus particularly adapted for the demineralization of natural brackish or sea waters is shown diagrammatically in Fig. 1. A bed 10 of mixed anion and cation exchange materials of conventional construction is fed at the top from a regenerating solution reservoir 12 through a valved regenerant feed conduit 14 and from a wash liquid reservoir 20 through a valved wash liquid conduit 22, and is fed at the bottom from a source 16 of solution to be treated through a valved feed conduit 18. Effluents from the bed are discharged through a waste effluent conduit 24 connecting with the bottom of the bed, and a product effluent conduit 26 connecting with the top of the bed.

The waste effluent conduit 24 connects alternatively, through a two-way valve 28, with the influent 29 of a waste regenerant recovery still 30, and with a wash liquid feed conduit 32 leading to the wash liquid reservoir 20. The product effluent conduit 26 connects alternatively, through a two-way valve 32 with the influent 33 to a product regenerant recovery still 34 and with a regenerant make-up conduit 36 leading to the regenerant solution reservoir 12.

The regenerant recovery stills are provided for the separation of the regenerant from the effluent solutions, and are essentially enclosed vessels in which the solutions are either heated or subjected to a reduced pressure to decompose the thermolytic salt into its readily recovered components. Each may consist generally of a container provided with a source of heat, for instance steam coils 38 and 39, and having liquid influent means 29 and 33, liquid effluent connections 40 and 41, and recovered regenerant outlet means shown 42 and 43.

When the thermolytic regenerant is dissociable entirely into gaseous components the regenerant outlets 42 and 43 may consist simply of conduits entering the top of the stills. When one of the dissociation components is an insoluble solid, the regenerant outlets must include, in addition to a conduit for the gaseous component, means for separating and collecting the solid component, for instance a filter, centrifuge, thickener or classifier, examples of which are all well known in the field of chemical engineering (see for instance Perry, ed., Chemical Engineers' Handbook, 2d ed., 1941, section 15).

The regenerant separated in the recovery stills is returned to the regenerant solution reservoir 12 by conveying means 44 which picks up the recovered regenerant at the regenerant outlets 42 and 43 from the two stills. For returning a recovered regenerant consisting entirely of gaseous components to the regenerant solution reservoir, the conveying means may consist of a heated conduit to deliver the regenerant as a gas. Regenerant components in the form of solids collected at the stills may be delivered by conventional conveyors to the reservoir. Conventional evaporating and conveying equipment meeting the requirements set forth above may be used throughout.

The liquid effluent connection 41 from the product still connects into a two-way valve 46 whereby regenerant-free product may be alternatively collected as demineralized product or returned to the wash liquid reservoir 20 through the wash liquid feed conduit 32. The liquid effluent connection 40 from the waste still discharges into an appropriate waste disposal system. The proper flow of the various solutions through this apparatus is provided by well-known means, including gravity flow and the utilization of pumps where necessary.

The process of this invention to demineralize natural waters is schematically outlined in Figs. 2, 3 and 4, and described below with reference to the apparatus described above.

Starting with the bed 10 of mixed anion and cation exchange materials in the exhausted and rinsed condition the first step of the cyclical process consists in regeneration, and for this purpose regenerating solution from the regenerating solution reservoir 12 is flowed downward through the bed. The initial effluent, chiefly displaced wash water, is directed into the wash liquid feed conduit by appropriate positioning of the two-way valve 28, and is returned to the wash liquid reservoir 20. When the effluent regenerant solution breaks through the bed, the valve 28 is positioned to cause it to flow into the waste regenerant recovery still 30, in which the residual regenerant is separated. The effluent stripped of regenerant is then discharged to waste through the effluent conduit 40 while the recovered regenerant is collected at the outlet 42 in the conveying system 44 and returned to the regenerating solution reservoir 12. The regeneration phase is outlined schematically in Fig. 2.

After the bed 10 has been regenerated, it is rinsed by flowing wash water through it from the wash liquid reservoir 20 until the residual regenerant solution has been substantially removed. The effluent wash water is passed to the waste regenerant recovery still 30 in the same manner as the effluent regenerant solution, and is there stripped of regenerant and discarded, while the recovered regenerant is returned to the regenerating solution reservoir 12. This phase of the cycle is shown schematically in Fig. 3.

The regenerated and rinsed bed 10 may now be used in the treatment of water for demineralization. The water from an appropriate source 16 is flowed upward through the bed, and the initial fraction, chiefly displaced wash water is directed into the regenerant make-up conduit 36 by proper positioning of the two-way valve 32 and collected in the regenerating solution reservoir 12. After effluent to make-up regenerant solution of proper concentration has been collected, the valve 32 is repositioned to pass the effluent into the product regenerant recovery still 34, and the regenerant is there stripped from the solution and returned from the regenerant outlet 43 through the conveying system 44 to the regenerant solution reservoir 12. The stripped demineralized solution discharged from the product still through effluent connection 41 is first passed by way of the two way valve 46 into the wash liquid make-up conduit 32 and to the wash liquid reservoir 20, until the supply of wash liquid has been replenished, and is then discharged from the system and collected as demineralized product. The exhaustion phase of the process is shown schematically in Fig. 4.

After the bed 10 has been exhausted it is again rinsed in the manner described above, and then regenerated for continuation of the cyclical process.

In the operation of this process the two effluent streams from the bed are divided to provide an adequate supply of wash water and regenerant make-up water to continue the process cyclically. It will be understood that fractions other than those utilized in the preferred embodiment described above may also be used for both the wash water and regenerant make-up water, as long as they are of the required composition.

The wash water should be of relatively low mineral content and the initial fraction of effluent during regeneration has proved satisfactory in supplying a fraction of these requirements, the remainder being supplied from a fraction of the final product.

The regenerant solution may be made up from any of the effluents that contain no substantial amounts of dissolved matter other than the regenerant chemical, and the initial effluent during the exhaustion phase is suitable for this purpose. Other effluent fractions, for instance the initial fraction during regeneration, preferably utilized as wash liquid, could also be used to supply part of the requirements of regenerant make-up solution but that would require that additional purified product from the product still be returned as wash liquid.

The regenerant solution is made up to the concentration necessary for efficient regeneration in accordance with conventional regenerating practice.

In a typical operation the apparatus and process of this invention was used to demineralize an aqueous solution 0.6 N in sodium chloride, a solution having a dissolved salt content about the same as that of sea water. The following operating conditions were established in the process described above:

*Regenerating solution 5.6 N ammonium carbonate*

Ion exchange bed:
  Volume _____ 800 cc.
  Ion exchange capacity _____ 500 milliequivalents.
  Anion exchanger _____ Amberlite IRA 400.
  Cation exchanger _____ Dowex 50.

Regenerant recovery stills—operating temp. 60° C., pressure 1 atm. All solutions are aqueous.

|  | Volume of solution, cc. | $(NH_4)_2CO_3$ conc. N | NaCl conc. N |
|---|---|---|---|
| Regeneration Phase: |  |  |  |
|   Influent Regenerant solution | 120 | 5.4 | 0.07 |
|   Effluent regenerant— |  |  |  |
|     To wash liquid reservoir | 50 | nil | 0.15 |
|     To waste still | 70 | 0.2 | 0.7 |
| Regeneration Rinse: |  |  |  |
|   Influent Wash liquid | 100 | nil | 0.12 |
|   Effluent Wash liquid | 100 | 2.0 | 1.3 |
| Exhaustion Phase: |  |  |  |
|   Influent raw water | 400 | 0.0 | 0.6 |
|   Effluent treated solution— |  |  |  |
|     To regenerant sol'n reservoir | 120 | 1.2 | 0.07 |
|     To product recovery still | 280 |  |  |
|       First fraction (to wash liquid reservoir) | 100 | 1.2 | 0.11 |
|       Second fraction (product) | 180 | 0.6 | 0.2 |
| Exhaustion Rinse: |  |  |  |
|   Influent Wash liquid | 50 | nil | 0.12 |
|   Effluent Wash liquid | 50 | 0.3 | 0.5 |
|   Effluent from waste still overall | 120 | nil | 1.1 |
|   Effluent from product still— |  |  |  |
|     First Fraction | 100 | nil | 0.11 |
|     Second Fraction | 180 | nil | 0.2 |

From the foregoing example it will be seen that this invention is entirely effective to produce substantially demineralized water, 0.2 N, from raw water having a mineral content about equal to that of sea water. The process of this invention is also useful to treat other brackish water supplies, or to treat commercial solutions, for instance sugar solutions or glycerine solutions, to demineralize them, appropriate modifications being made to prevent valuable products from appearing in the waste.

Although ammonium carbonate is the preferred thermolytic salt for use in this invention, others may also be used with equally satisfactory results. In this connection it will be understood that solutions of certain of such salts of appreciable concentration may be formed only at elevated pressures which necessitates the use of an enclosed system capable of operating under pressure. In such installation the regenerant recovery still, instead of being heated, may be operated at a reduced pressure to effect decomposition of the salt. For instance, a regenerant solution about 0.6 N in magnesium bicarbonate may be formed at about 20° C. by dissolving magnesium carbonate in water under a carbon dioxide pressure of about six atmospheres, and such a solution may be used in a system designed to operate under a carbon dioxide pressure of six atmospheres. The magnesium bicarbonate may be readily recovered from the effluent solutions by operating the recovery stills under a vacuum to cause the magnesium bicarbonate to decompose into carbon dioxide and magnesium carbonate, the former being compressed and piped back to the regenerant makeup reservoir and the latter being separated from the effluent solution and conveyed back to the regenerant makeup reservoir to be combined in the solvent with the compressed recovered carbon dioxide to form magnesium bicarbonate.

Similar operating techniques may be used with such thermolytic salts as calcium bicarbonate, and calcium bisulfite may be used in systems operating under a sulfur dioxide pressure.

A suitable regenerant recovery still system for use with thermolytic salts dissociable into a gaseous component and a solid component, such as magnesium bicarbonate, is shown schematically in Fig. 5. The effluent conduit 50, corresponding to conduits 29 or 33 in Fig. 1, connects from the bed 10 (operating in this case under pressure) to the still 52 through a throttling valve 54. A conduit 56 connects the still 52 with the enclosed regenerant solution reservoir 12a, corresponding to reservoir 12 in Fig. 1, and a pump 58 in said conduit maintains a vacuum in the still and provides for the delivery of the gaseous component to the regenerant solution reservoir under pressure. The effluent from the still, after decomposition of the thermolytic salt and containing the insoluble solid component thereof, is delivered by a pump 60 through a conduit 62 to a separator 64, for instance a rotary filter, in which the solid component is removed from effluent. The separated solid component of the thermolytic salt is collected from the separator 64 on a conveyor 66 leading to a hopper 67 into which also feeds the regenerant makeup conduit 36a, corresponding to and replacing conduit 36 in Fig. 1. The solid component is stored in the hopper 67 until the fraction of effluent product to be utilized as regenerant makeup solvent is collected, at which time the solid component is slurried with the solvent and delivered by a pump 68 through a conduit 70 from the hopper 67 to the regenerant reservoir 12a, and there combined under pressure with the gaseous component of the thermolytic salt to form fresh regenerant solution.

The invention has been described in detail with reference to a system for demineralizing water, wherein the only material added to the system is the raw water to be treated, a fraction of which is necessarily discarded as waste product. In commercial installations having access to an abundant water supply, for use in treating industrial solutions to demineralize them, it would be obviously desirable to prevent any of the solution to be treated from appearing in the waste streams. In such installations complete rinsing by outside water will maintain separation of the steps, and allow all of the solution treated, plus additional rinse water, to be collected in the product streams. In such installations the effluent streams would not be divided to provide regenerant makeup solution and wash liquid, but would be collected as separate waste and product streams after removal of the regenerant chemical.

It will be understood that although the process is described herein as preventing the consumption of regenerant, in actual practice small amounts are lost due to incomplete separation of regenerant in the recovery stills, and leaks, and these must be replenished from time to time. Generally, however, careful design of the apparatus according to sound engineering principles will keep these losses below 1.0 percent.

Having thus disclosed my invention and described in detail the preferred embodiment thereof, I claim and desire to secure by Letters Patent:

1. Ion exchange apparatus comprising a bed of mixed anion and cation exchange materials; a regenerant solution reservoir connecting through flow control means to an influent connection at one end of said bed; a wash liquid reservoir connecting through flow control means to an influent connection at the same end of said bed; influent means for the solution to be treated connecting through flow control means to the other end of said bed; a waste effluent conduit connecting with the end of the bed opposite the influent connections for the regenerant solution reservoir and wash liquid reservoir; a product effluent conduit connecting with the end of the bed opposite the influent means for the solution to be treated; a waste-regenerant recovery still for separating a thermolytic regenerant from effluent liquids and having effluent liquid inlet means connecting with the said waste effluent conduit, regenerant-free waste liquid outlet means, and recovered regenerant outlet means; a product-regenerant recovery still for separating a thermolytic regenerant from effluent liquids and having effluent liquid inlet means connecting with said product effluent conduit, regenerant-free product liquid outlet means, and recovered regenerant outlet means; a wash liquid conduit leading to said wash liquid reservoir and connecting through flow control means with said waste effluent conduit and also connecting through flow control means to the regenerant-free liquid outlet of said product-regenerant recovery still; a regenerant makeup conduit leading to said regenerant solution reservoir connecting through flow control means with said product effluent conduit; and conveying means leading to said regenerant solution reservoir from the recovered regenerant means of said waste and product-regenerant recovery stills, whereby recovered regenerant may be conveyed to said regenerant reservoir.

2. Ion exchange apparatus comprising a bed of mixed anion and cation exchange materials, a regenerant solution reservoir having a valved regenerant feed conduit from said bed to said reservoir, flow control means to said bed for introducing a solution to be treated, a regenerant recovery waste still and product still each adapted to vaporize volatile regenerant, separate valved conduit means for passing separate effluents from said bed to said stills, conduit means for conveying recovered regenerant from said stills to said regenerant reservoir, and regenerant-free outlet means from each of said stills.

3. The method of treating aqueous solutions to remove dissolved electrolyte comprising alternately (1) contacting the solution with a bed of mixed anion and cation exchange materials in forms determined by the anions and cations of a thermolytic salt, thereby to exchanges the electrolyte in the solution with thermolytic salt from the bed, and collecting the effluent treated solution, and (2) regenerating the bed with a regenerating solution of the thermolytic salt, thereby to place the bed again in the forms determined by the anions and cations of the thermolytic salt, and collecting the effluent regenerant solution; rinsing the bed with water after each of said steps and collecting the effluent rinse water; and in said process decomposing and separating residual thermolytic salt from said effluent treated solution, from said effluent regenerant solution, and from said effluent rinse water; collecting water suitable to rinse the bed from the effluent liquids and using them in the process to rinse the bed as aforesaid; collecting a fraction of liquid suitable as a regenerant solvent, dissolving the thermolytic salt separated from the effluent solutions in said fraction and using the thermolytic salt solution to regenerate the bed as aforesaid; and collecting the remaining effluent treated solution after separation of the thermolytic salt therefrom as treated product.

4. The method of treating solutions to remove dissolved electrolyte comprising the cyclical operations of contacting the solution with a bed of mixed anion and cation exchange materials in forms determined by the anions and cations of a thermolytic salt, thereby to exchange the electrolyte in said solution with the thermolytic salt from said bed, decomposing and separating the thermolytic salt from the solution after said exchange, dissolving the thermolytic salt in a solvent therefor to form a regenerating solution, and passing the regenerating solution through said bed after the exchange again to place the bed in combination with anions and cations of the thermolytic salt.

5. The method of treating solutions to remove dissolved electrolyte comprising contacting the solution with a bed of mixed anion and cation exchange materials in forms determined by the anions and cations of a thermolytic salt, thereby to exchange the electrolyte in said solution with the thermolytic salt from said bed, and decomposing and separating the thermolytic salt from the solution after said exchange.

6. The method of treating solutions to remove dissolved electrolyte comprising contacting the solution with a bed of mixed anion and cation exchange materials in forms determined by the anions and cations of a thermolytic salt selected from the group consisting of ammonium carbonate, ammonium bicarbonate, ammonium sulfite, calcium bicarbonate, calcium bisulfite and magnesium bicarbonate, thereby to exchange the electrolyte in said solution with the thermolytic salt from the bed, and decomposing and separating the thermolytic salt from the solution after said exchange.

7. The method of treating solutions to remove dissolved electrolyte comprising contacting the solution with a bed of mixed anion and cation exchange materials in forms determined by the anions and cations of a thermolytic salt selected from the group consisting of ammonium carbonate, ammonium bicarbonate, ammonium sulfite, calcium bicarbonate, calcium bisulfite and magnesium bicarbonate, thereby to exchange the electrolyte in said solution with the thermolytic salt from the bed, decomposing the salt in the solution after said exchange into its components by subjecting the solution to temperature-pressure conditions to effect dissociation of the salt, and separating said components from the solution.

8. The method of treating solutions to remove dissolved electrolyte comprising the cyclical operations of contacting the solution with a bed of mixed anion and cation exchange materials in forms determined by the anions and cations of a thermolytic salt selected from the group consisting of ammonium carbonate, ammonium bicarbonate, ammonium sulfite, calcium bicarbonate, calcium bisulfite and magnesium bicarbonate, thereby to exchange the electrolyte in said solution with the thermolytic salt from said bed, subjecting said solution after said exchange to temperature-pressure conditions effective to cause dissociation of the thermolytic salt into its components and separating said components from said solution, combining the recovered components in a solvent therefor under associative pressure-temperature conditions to form a solution of regenerating strength, and passing the regenerating solution through said bed after the exchange again to place the bed in combination with the anions and cations of the thermolytic salt.

9. The method of treating aqueous solutions to remove dissolved electrolyte comprising alternately (1) contacting the solution with a bed of mixed anion and cation exchange materials in forms determined by the anions and cations of a thermolytic salt selected from the group consisting of ammonium carbonate, ammonium bicarbonate, ammonium sulfite, calcium bicarbonate, calcium bisulfite and magnesium bicarbonate, thereby to exchange the electrolyte in the solution with thermolytic salt from the bed, and collecting the effluent treated solution, and (2) regenerating the bed with a regenerating solution of the thermolytic salt, thereby to place the bed again in combination with the anions and cations of the thermolytic salt, and collecting the effluent regenerant solution; rinsing the bed with water after each of said steps and collecting the effluent rinse water; and in said process decomposing and separating residual thermolytic salt from said effluent treated solution, from said effluent regenerant solution, and from said effluent rinse water by subjecting each of said solutions to temperature-pressure conditions effective to cause dissociation of the thermolytic salt, and recovering the components thereof; collecting water suitable to rinse the bed from the effluent liquids and using them in the process to rinse the bed as aforesaid; collecting a fraction of liquid suitable as a regenerant solvent, dissolving the thermolytic salt recovered from the effluent solutions in said fraction under associative conditions and using the thermolytic salt solution to regenerate the bed as aforesaid; and collecting the remaining effluent treated solution after separation of the thermolytic salt therefrom as treated product.

10. The method of treating solutions to remove dissolved electrolyte comprising the cyclical operations of contacting the solution with a bed of mixed anion and cation exchange materials in combination with the anions and cations of ammonium carbonate, thereby to exchange the electrolyte in said solution with ammonium carbonate from said bed, heating said solution after said exchange to a temperature above the decomposition temperature of the ammonium carbonate to vaporize the ammonium carbonate from the solution and collecting the recovered ammonium carbonate, dissolving the recovered ammonium carbonate in a solvent therefor to form a solution of regenerating strength, and passing the regenerating solution through said bed after the exchange again to place the bed in combination with the anions and cations of the ammonium carbonate.

11. The method of treating aqueous solutions to remove dissolved electrolyte comprising alternately (1) contacting the solution with a bed of mixed anion and cation exchange materials in combination with the anions and cations of ammonium carbonate, thereby to exchange the electrolyte in the solution with ammonium carbonate from the bed, and collecting the effluent treated solution, and (2) regenerating the bed with a regenerating solution of the ammonium carbonate, thereby to place the bed again in combination with the anions and cations of the ammonium carbonate, and collecting the effluent regenerant solution; rinsing the bed with water after each of said steps and collecting the effluent rinse water; and in said process vaporizing residual ammonium carbonate from said effluent treated solution, from said effluent regenerant solution, and from said effluent rinse water by heating each of said solutions to a temperature above the decomposition temperature of the ammonium carbonate, and recovering the ammonium carbonate; collecting water suitable to rinse the bed from the effluent liquids and using said water in the process to rinse the bed as aforesaid; collecting a fraction of liquid suitable as a regenerant solvent, dissolving the ammonium carbonate vaporized from the effluent solutions in said fraction and using the ammonium carbonate solution to regenerate the bed as aforesaid; and collecting the remaining effluent treated solution after vaporization of the ammonium carbonate therefrom as treated product.

12. The method of treating solutions to remove dissolved non-thermolytic electrolyte comprising contacting the solution with a bed of mixed anion and cation exchange materials in combination with the anions and cations of magnesium bicarbonate, thereby to exchange the electrolyte in said solution with magnesium bicarbonate from said bed, subjecting said solution after said exchange to temperature-pressure conditions effective to cause dissociation of the magnesium bicarbonate into magnesium carbonate and carbon dioxide, separating the magnesium carbonate and the carbon dioxide from said solution, combining the magnesium carbonate and carbon dioxide in a solvent under associative conditions to form a regenerating solution of magnesium bicarbonate, and passing said regenerating solution through said bed after the exchange again to place the bed in combination with the anions and cations of the magnesium bicarbonate.

13. The method of treating solutions to remove dissolved non-thermolytic electrolyte comprising contacting the solution with a bed of mixed anion and cation exchange materials each having substantially the same acid and basic strength, respectively in combination with the anions and cations of magnesium bicarbonate, thereby